United States Patent
Verdier et al.

(10) Patent No.: US 12,549,385 B2
(45) Date of Patent: Feb. 10, 2026

(54) METHOD FOR IMPLEMENTING A SERVICE IN A SERVICE CHAIN AND ELECTRONIC DEVICE ASSOCIATED THERETO

(71) Applicant: Orange, Issy-les-moulineaux (FR)

(72) Inventors: Matthieu Verdier, Chatillon (FR); Jean-Philippe Wary, Chatillon (FR); Gilles Macario-Rat, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 167 days.

(21) Appl. No.: 18/486,476

(22) Filed: Oct. 13, 2023

(65) Prior Publication Data
US 2024/0129135 A1    Apr. 18, 2024

(30) Foreign Application Priority Data
Oct. 14, 2022   (FR) ...................................... 2210575

(51) Int. Cl.
*H04L 29/00* (2006.01)
*H04L 9/32* (2006.01)

(52) U.S. Cl.
CPC .......... *H04L 9/3265* (2013.01); *H04L 9/3213* (2013.01)

(58) Field of Classification Search
CPC ..... H04L 9/3265; H04L 9/3213; H04L 45/50; H04L 45/34; H04L 45/0377; H04L 45/64
See application file for complete search history.

(56) References Cited

U.S. PATENT DOCUMENTS

| | | | |
|---|---|---|---|
| 10,211,987 B2 * | 2/2019 | Dara ....................... | H04L 63/06 |
| 2008/0289039 A1 * | 11/2008 | Rits ....................... | H04L 63/123 |
| | | | 726/22 |
| 2014/0198791 A1 * | 7/2014 | Lim ....................... | H04L 45/00 |
| | | | 370/392 |
| 2016/0315819 A1 * | 10/2016 | Dara ....................... | H04L 41/28 |

OTHER PUBLICATIONS

Li et al., "Token Routing: A Power Efficient Method for Securing AODV Routing Protocol", IEEE International Conference on Networking, Sensing and Control. IEEE, (Year: 2006).*
Sonnino et al., "Replay Attacks and Defenses Against Cross-shard Consensus in Sharded Distributed Ledgers", 2020 IEEE European Symposium on Security and Privacy (EuroS&P), Sep. 7-11, 2020.*
French Search Report and Written Opinion dated May 30, 2023 for Application No. FR2210575.

* cited by examiner

*Primary Examiner* — Morshed Mehedi
(74) *Attorney, Agent, or Firm* — Knobbe, Martens, Olson & Bear, LLP

(57) ABSTRACT

A method is described for implementing a current service, of a chain of n services, the method including receiving, from the service preceding the current service in the chain, a first routing token comprising message routing data between the services of the chain and a first chaining token comprising data of evidence of a passage through the previous service, and verifying that the current service is a legitimate recipient of the first routing token. The method also includes implementing a function of the current service, generating a second chaining token based on the first chaining token and a second routing token determined from the first routing token, and transmitting, to the service following the current service in the chain, the second chaining token and the second routing token.

16 Claims, 9 Drawing Sheets

[Fig.1]
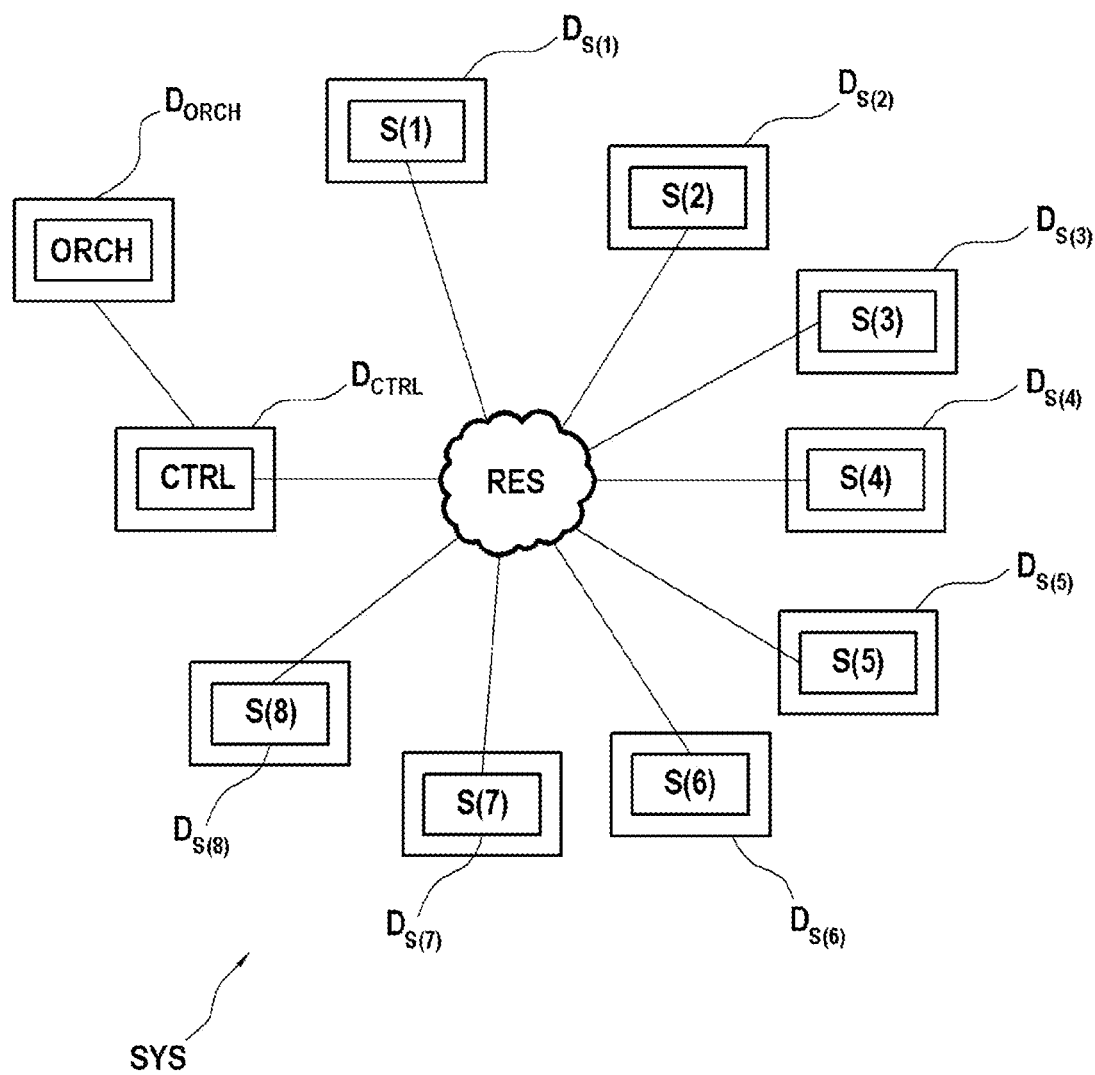

[Fig.2A]
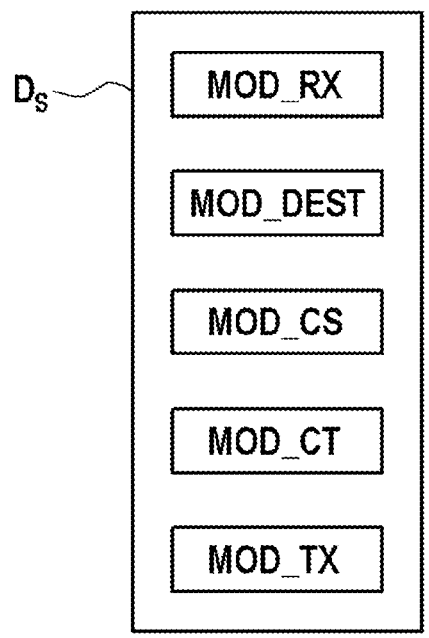
[Fig.2B]
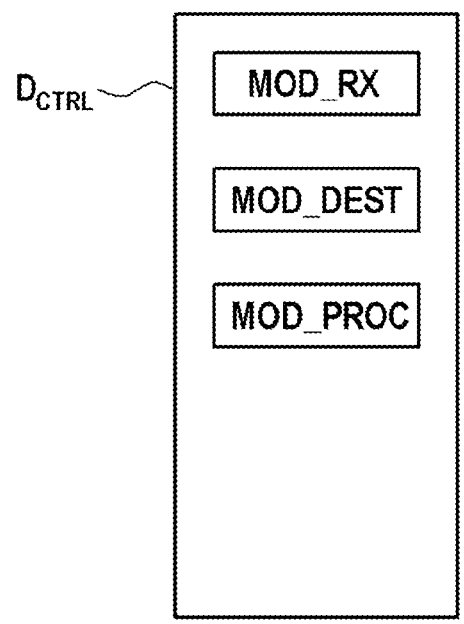

[Fig.3A]
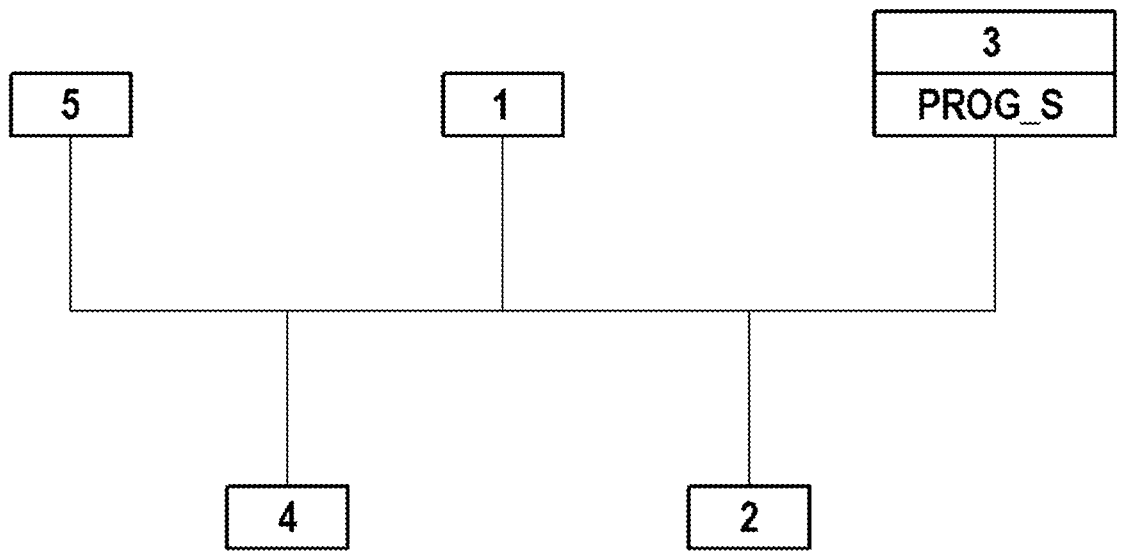
[Fig.3B]
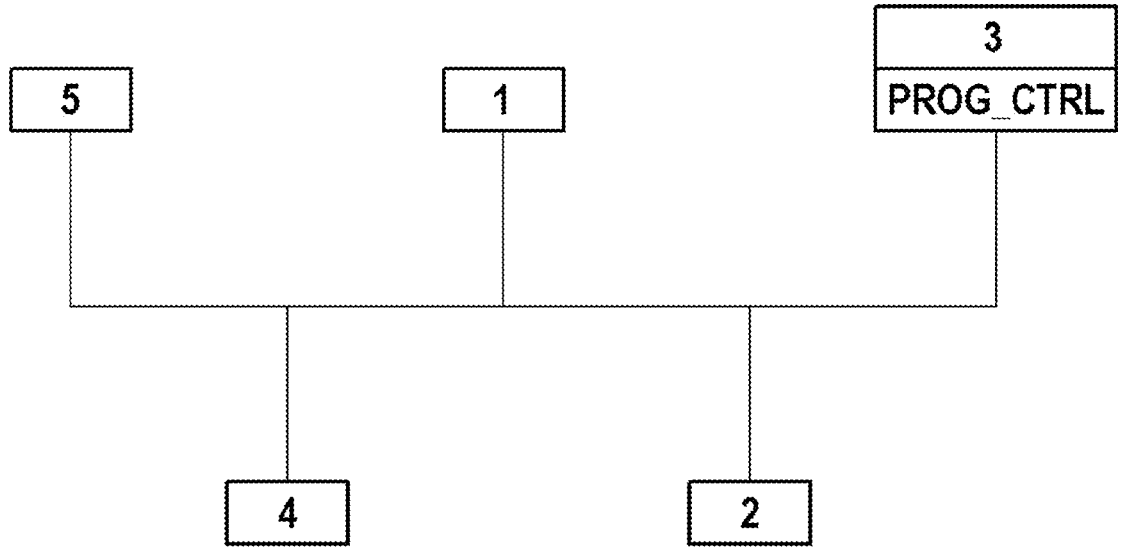

[Fig.4]
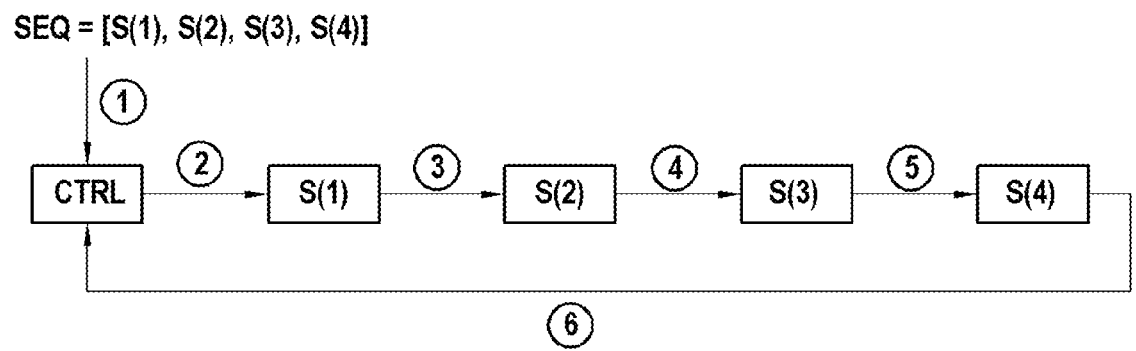

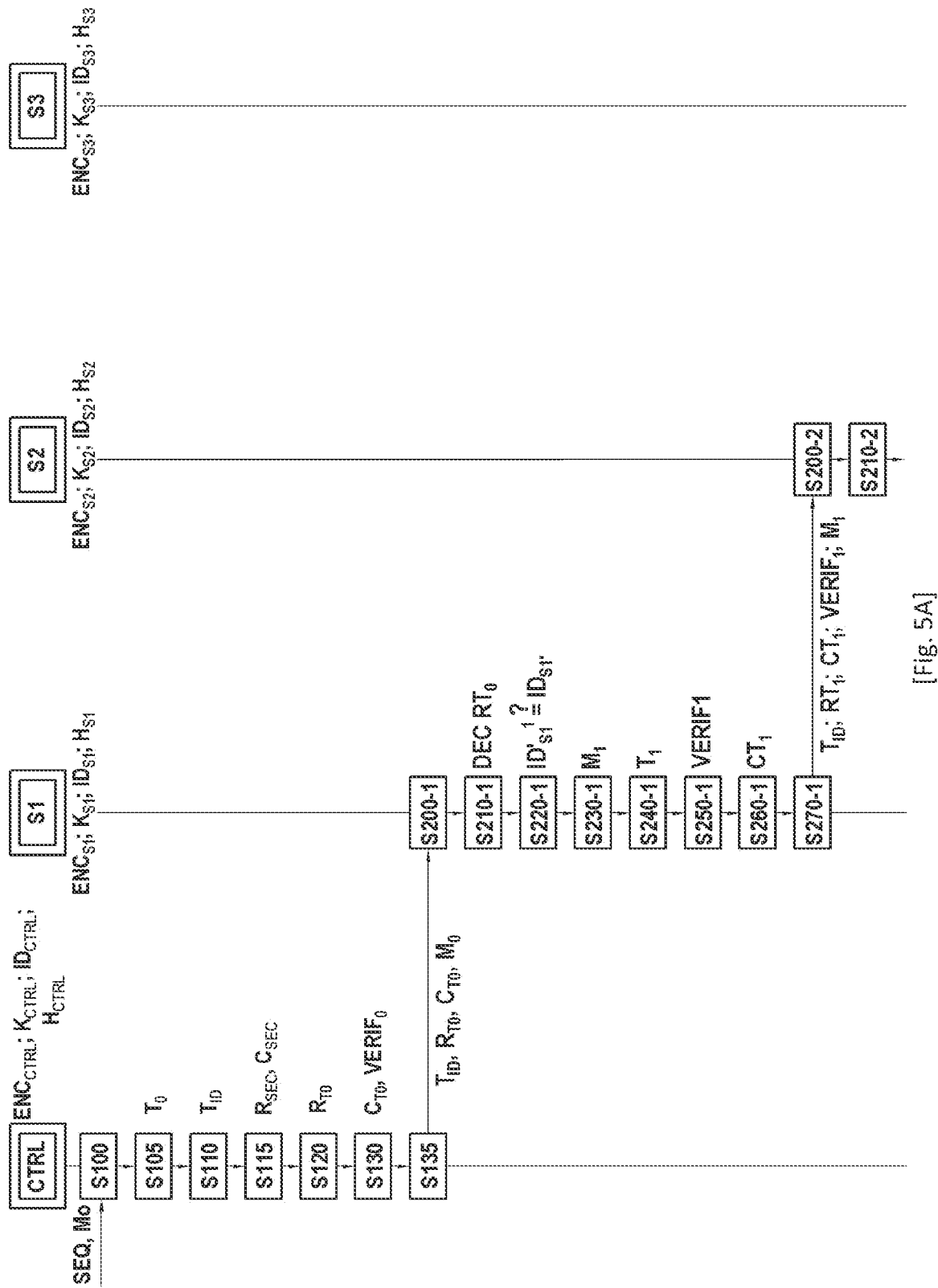
[Fig. 5A]

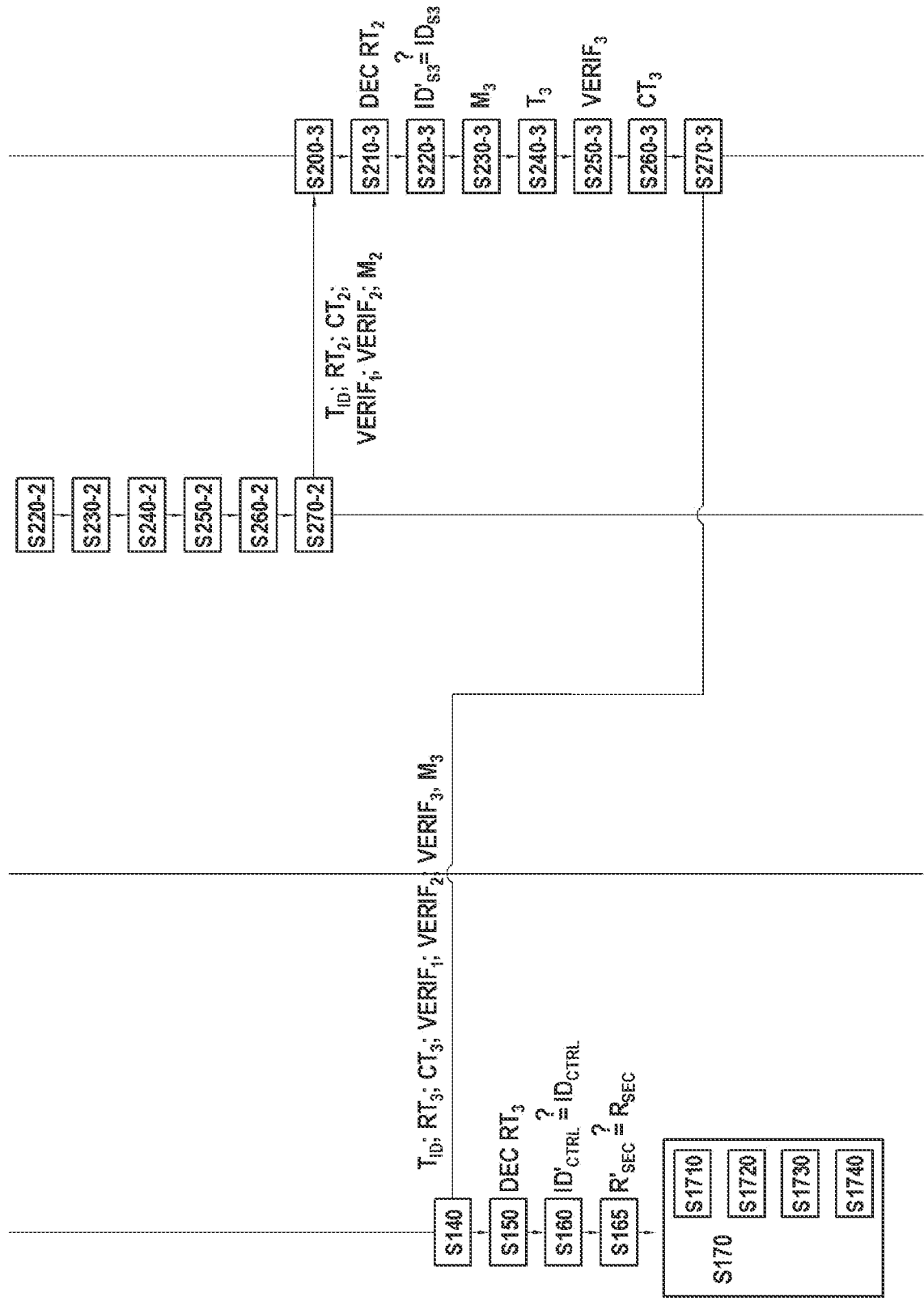

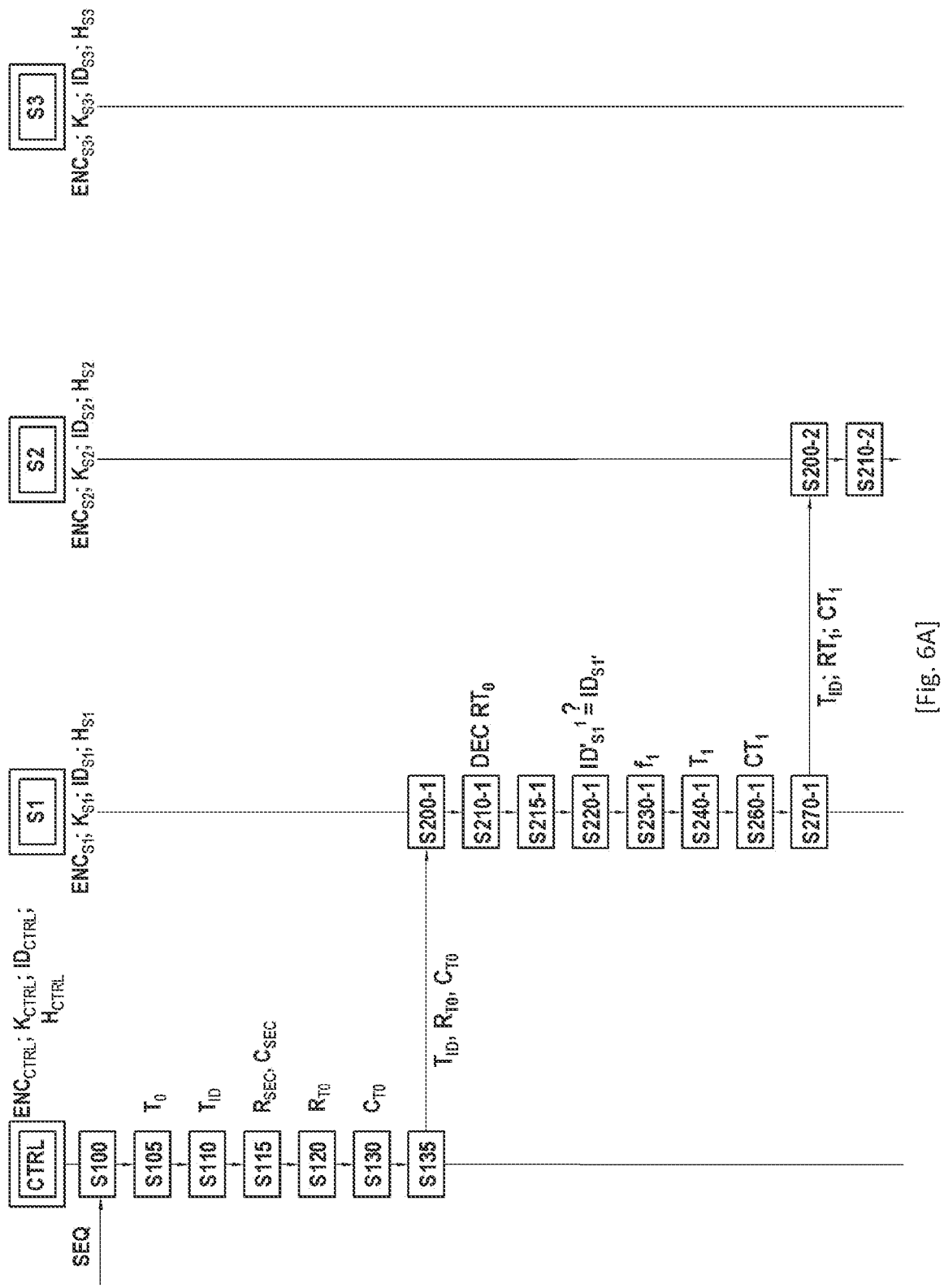
[Fig. 6A]

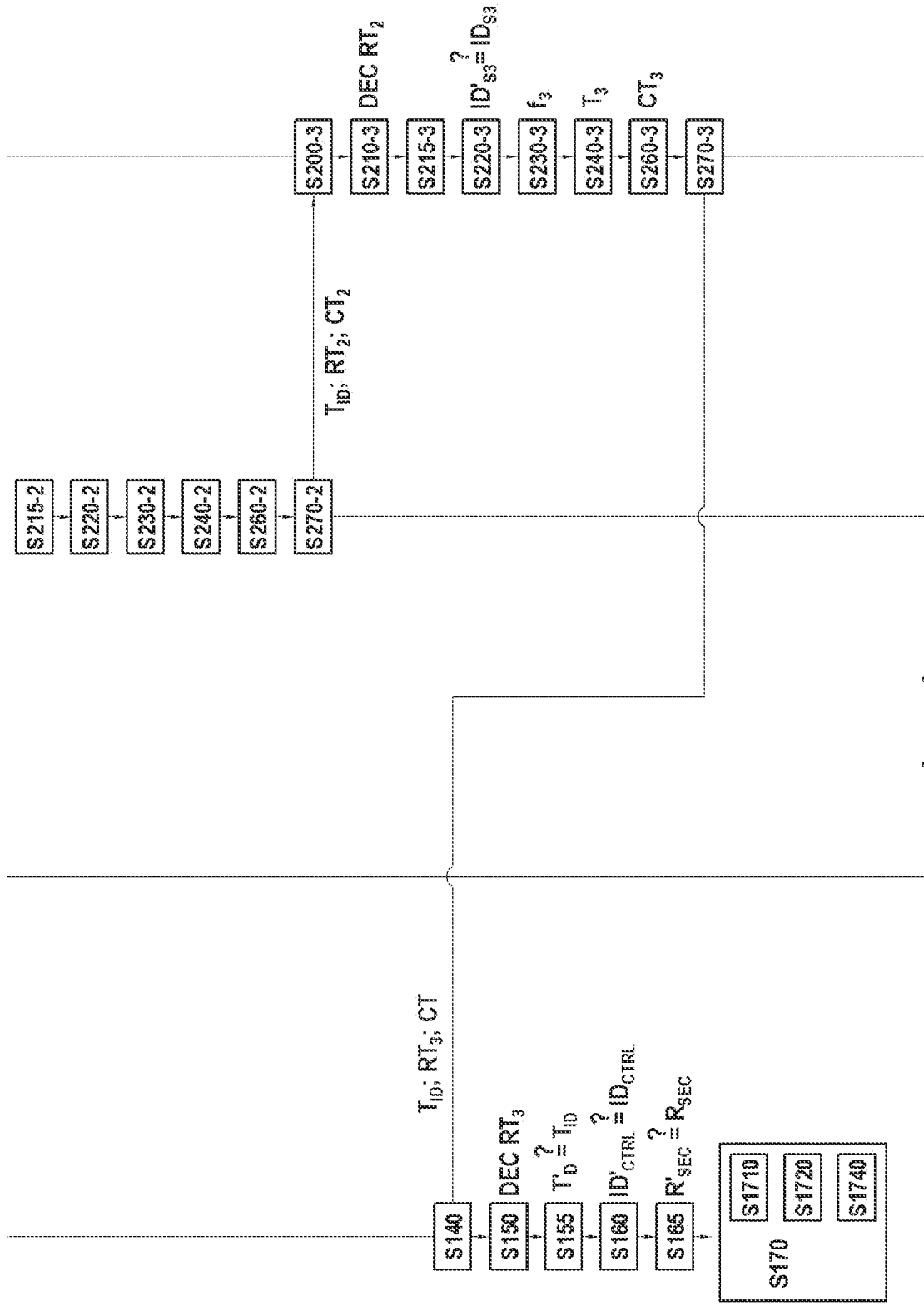

[Fig.7]
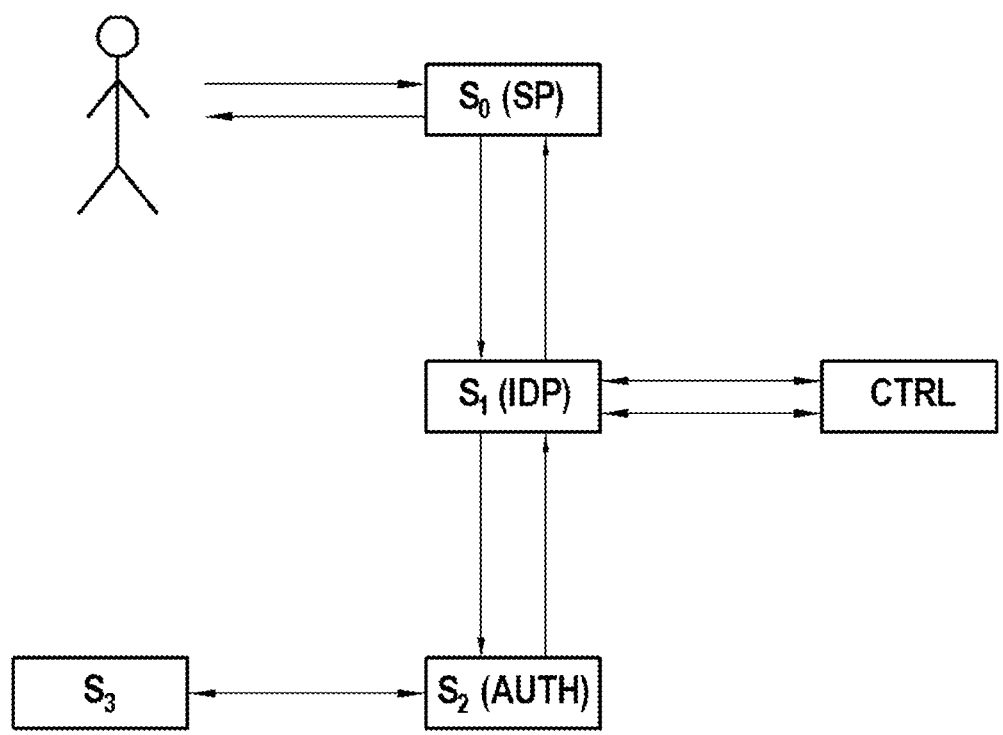

METHOD FOR IMPLEMENTING A SERVICE IN A SERVICE CHAIN AND ELECTRONIC DEVICE ASSOCIATED THERETO

TECHNICAL FIELD

The disclosed technology belongs to the general field of transactions generated by implementing a sequence of services chained together. It relates more particularly to a method for implementing a service in a service chain. It also relates to an electronic device for implementing at least one service, a method for verifying a service chain, and an electronic device for verifying a service chain.

DISCUSSION OF RELATED TECHNOLOGY

Service-oriented architectures make it possible to design a transaction as a set of interconnected services, accessible through standard protocols. Typically, to design this transaction, a data stream accesses a service chain in a particular order, that is to say a set of services chained together and accessible through a telecommunications network.

Therefore, the data transmission processes must comply with sufficiently strict certification and security conditions to guarantee the reliability of the routing of the exchanged data streams.

In this context, traffic engineering solutions are currently known which make it possible to monitor and regulate the transmission of data in a communications network. Some, such as segment routing or service function chaining solutions implement specific instructions which make it possible to guarantee the correct forwarding of data to a specific destination.

However, although they ensure relative reliability of data traffic in a network, these solutions do not make it possible to adapt the service chain on the fly, for example by replacing or adding a service to the chain, or even by adapting the electronic device implementing a given service.

Another drawback is that the existing approaches do not make it possible to reliably give evidence that the traffic actually passed through a given electronic device and a fortiori that this device actually implemented a service.

Finally, very often, the devices implementing services are managed by different actors, and are therefore not subject to the same security rules. However, strict cooperation between several actors complicates compliance with uniform rules and monitoring.

There is therefore a need to propose a more flexible approach, but also one that can guarantee the atomicity of a transaction requiring the application of a sequence of services, even if the security levels applied by the electronic devices implementing these services differ.

SUMMARY

The disclosed technology aims to overcome all or part of the drawbacks of the prior art, in particular those set out above, by proposing a solution that makes it possible to flexibly generate a transaction as a sequence of several services, and which can guarantee the atomicity of this transaction, even if the security levels applied by the electronic devices implementing these services differ.

Within the meaning of the disclosed technology, the property of atomicity results from a demonstration of the completion of a global transaction requiring the application of a service chain, and this without alteration on the orchestration of the planned services and on the course of the sequencing of the series of said services.

To this end, and according to a first aspect, the disclosed technology relates to a method for implementing a service, called current service, of a chain of n services, the method comprising:
  receiving, from the service preceding the current service in the chain, a first routing token comprising message routing data between the services of the chain and a first chaining token comprising data of evidence of a passage through the previous service;
  verifying that the current service is a legitimate recipient of the first routing token;
  implementing a function of the current service;
  generating a second chaining token based on the first chaining token and a second routing token determined from the first routing token; and,
  transmitting, to the service following the current service in the chain, the second chaining token and the second routing token.

The application of the method according to the disclosed technology prevents, by the non-achievement of a service called final service, any alteration either of a processing step or of data emitted or received at the level of each of the chained services following an order established a priori.

Thus, the service is provided atomically in the sense that any alteration thereof in its achievement results in a service stopping or denial. And a fortiori, the delivery of the finalized service gives evidence that the service was achieved without alteration and therefore that it is indeed intact or "atomic".

Generally, it is considered that the steps of a method should not be interpreted as being related to a notion of temporal succession.

It should also be noted that the method according to the disclosed technology is independent of the protocols implemented or of the services (e.g., of the functions implemented by said services).

A function implemented by one of said services can comprise a processing on received data or the complete execution of a protocol itself involving a new service chain within the meaning of the disclosed technology.

In particular modes of implementation, the method according to the disclosed technology can also include one or more of the following characteristics, taken separately or in all the technically possible combinations.

In particular modes of implementation, the method further comprises:
  obtaining an emitter service identifier by application of a decryption function to the first routing token, the decryption function using a decryption key associated with the current service; and
  verifying that the emitter service is a legitimate emitter.

This service identifier corresponds for example to an API carried by a URL; an email address or a messaging identifier; an IP port of an electronic device carried by an IP address; an identifier carried by a messaging system; a port number on other local connectivity protocols associated with a logical address following these communication protocols; a MAC address; a memory address or an interruption within an electronic device; an electronic certificate, for example compliant with the standard X.509.

This characteristic is advantageous since it allows the current service to make sure, in a secure manner, that the emitter service is a legitimate emitter of the routing token and of the data transmitted with this routing token.

In particular modes of implementation, the method further comprises obtaining a recipient service identifier by application of a decryption function to the first routing token, the decryption function using a decryption key associated with current service; and verifying that the current service is a legitimate recipient comprises comparing the recipient service identifier with the identifier of this service This characteristic is advantageous since it allows the current service to make sure, in a secure manner, that it is the legitimate recipient of the routing token and of the data transmitted with this routing token, and a fortiori that it corresponds to the service to be applied, in accordance with a previously defined chain.

In particular modes of implementation, the second routing token is generated by application of a decryption function to the first routing token, and the decryption function uses a decryption key associated with the current service.

This characteristic is advantageous since it allows the current service to determine, in a secure manner, the next service of the chain to which data must be transmitted.

In particular modes of implementation, the method further comprises generating, by the current service, a time stamp $T_i$, and the second chaining token is generated as a function of this time stamp.

This characteristic is advantageous since it allows detecting a potential replay attack.

In particular modes of implementation, the second chaining token (CT(i)) is such that:

$$CT(i)=ENC_{S(i)}(CT(i-1)|T_i|HMAC(RT(i),K_{S(i)}),K_{S(i)})$$

with $ENC_{S(i)}(\ )$ an encryption function associated with the service S(i) and using an encryption key $K_{S(i)}$, | a concatenation function, and $HMAC_{S(i)}(\ )$ a cryptographic function combining a hash function with the encryption key $K_{S(i)}$, and RT(i) the second routing token.

In particular modes of implementation, encryption, decryption, signature and identification functions at the level of the service (S(i)) are based on public key cryptographic technologies, and refer to an associated electronic certificate.

According to a second aspect, the disclosed technology relates to a method for verifying a chain of n services, the method being implemented by a monitoring service and comprising:
  receiving a routing token and a chaining token coming from the $n^{th}$ service of the chain;
  verifying that the monitoring service is a legitimate recipient of the routing token; and,
  verifying a passage through the n services of the chain, in accordance with said chain, by processing of the chaining token, the processing comprising iteratively calculating a value $CT_{VALID}(i)$ for i=n . . . 1, based on a value $CT_{VALID}(i-1)$ and a chaining token RT(i) comprising data of evidence of a passage through a service S(i).

In particular modes of implementation, the verification method further comprises:
  obtaining an emitter service identifier by application of a decryption function to the routing token, the decryption function using a decryption key associated with the monitoring service; and,
  verifying that the emitter service is a legitimate emitter.

This characteristic is advantageous since it allows the monitoring service to make sure, in a secure manner, that it is indeed the emitter service as defined in the chain that actually transmitted the routing token.

In particular modes of implementation, the monitoring service comprises an identifier of this monitoring service, and the method further comprises obtaining, by the monitoring service, a recipient service identifier by application of a decryption function to the routing token RT(n), the decryption function using a decryption key associated with the monitoring service; and verifying that the monitoring service is a legitimate recipient comprises comparing the recipient service identifier with the identifier of this monitoring service.

This characteristic is advantageous since it allows the monitoring service to make sure, in a secure manner, that it is the legitimate recipient of the routing token and of the data transmitted with this routing token.

In particular modes of implementation, the method further comprises:
  obtaining, by the monitoring service, a first secret value used for the generation of a routing token RT(0) intended to be transmitted to the first service of the chain;
  obtaining, by the monitoring service, a second secret value by application of a decryption function to the routing token RT(n), the decryption function using a decryption key associated with the monitoring service; and,
  comparing, by the monitoring service, the first secret value and the second secret value.

This characteristic is advantageous since it allows the monitoring service to make sure that the routing token received comes from a processing, by different services, of an initial routing token that this monitoring service had initially generated.

In particular modes of implementation, the value $CT_{VALID}(i)$ is defined such that:

$$CT_{VALID}(i)=DENC_{S(i)}(CT(i-1)|T_i|HMAC_{S(i)}(RT(i),K_{S(i)}),K_{S(i)})$$

with DENC( ) a decryption function using a cryptographic key $K_{S(i)}$ associated with the service S(i), CT(i−1) a chaining token associated with the service S(i−1), $T_i$ a stamp time generated by the service S(i), HMAC( ) a cryptographic function associated with the service S(i) and combining a hash function $H_{S(i)}$ with the cryptographic key $K_{S(i)}$, and RT(i) a routing token, and the verification method further comprises:
  calculating a value $CT_{VALID}(0)$ such that:

$$CT_{VALID}(0)=DENC(C_{SEC}|T_0|HMAC(RT(0),K_{CTRL}),K_{CTRL})$$

with $C_{SEC}$ a third secret value, $K_{CTRL}$ a cryptographic function associated with the monitoring service; and
  comparing (S1740) between the calculated token $CT_{VALID}(0)$ and a reference token CT(0)'.

In particular modes of implementation, the verification method further comprises generating a routing token RT(0) recursively from a routing token RT(n) for i=n−1 . . . 0.

According to a third aspect, the disclosed technology relates to an electronic device for implementing at least one service comprising:
  a module for receiving, from the service preceding the current service in the chain, a first routing token comprising message routing data between the services of the chain and a first chaining token comprising the data of proof of a passage through the previous service;
  a module for verifying that the at least one service is a legitimate recipient of the first routing token;
  a module for implementing a function of the service;
  a module for generating a second chaining token based on the first chaining token and a second routing token determined from the first routing token; and, a module for transmitting, to the service following said service in the chain, the second chaining token and the second routing token.

According to a fourth aspect, the disclosed technology relates to an electronic device for verifying a chain of n services including a monitoring service comprising:
- a module for receiving a routing token RT(n) and a chaining token CT(n) coming from the $n^{th}$ service S(n) of the chain;
- a module for verifying that said monitoring service is a legitimate recipient of the routing token; and,
- a module for verifying a passage through the n services of the chain, in accordance with said chain, by processing of the chaining token, the processing comprising iteratively calculating a value $CT_{VALID}(i)$ for i=n . . . 1, based on a value $CT_{VALID}(i-1)$ and on a chaining token RT(i) comprising data of evidence of a passage through a service S(i).

According to a fifth aspect, the disclosed technology relates to a system comprising at least one electronic device for implementing at least one service, and an electronic device for verifying a chain of n services.

According to a sixth aspect, the disclosed technology relates to a computer program including instructions for the implementation of a method for implementing a service or of a method for verifying a service chain, when said program is executed by a processor.

According to a seventh aspect, the disclosed technology relates to a recording medium readable by a computer on which the computer program according to the disclosed technology is recorded.

BRIEF DESCRIPTION OF THE DRAWINGS

Other characteristics and advantages of the disclosed technology will emerge from the description given below, with reference to the appended drawings which illustrate an exemplary embodiment without any limitation. In the figures:

FIG. 1 schematically represents one exemplary embodiment of a system in which the disclosed technology is implemented;

FIG. 2A schematically represents one particular implementation of an electronic device for implementing at least one service as proposed;

FIG. 2B schematically represents one particular implementation of an electronic device for verifying a service chain as proposed;

FIG. 3A schematically represents one example of hardware architecture of an electronic device for implementing at least one service;

FIG. 3B schematically represents one example of hardware architecture of an electronic device for verifying a service chain;

FIG. 4 illustrates the general principle of the disclosed technology, according to one particular implementation;

FIG. 5 comprises FIG. 5A and FIG. 5B and represents, in flowchart form, a first particular implementation of a general method for monitoring a transaction resulting from the passage through a set of chained services as proposed, implemented in a system comprising the electronic device for verifying a service chain of FIG. 2B, and the electronic device for implementing at least one service of FIG. 2A;

FIG. 6 comprises FIG. 6A and FIG. 6B and represents, in flowchart form, a second particular implementation of a general method for monitoring a transaction resulting from the application of a set of chained services as proposed, implemented in a system comprising the electronic device for verifying a service chain of FIG. 2B, and the electronic device for implementing at least one service of FIG. 2A;

FIG. 7 represents one exemplary implementation of the disclosed technology, in accordance with the second particular implementation illustrated in FIG. 6, in the context of a "Mobile Connect" type transaction.

DESCRIPTION OF THE EMBODIMENTS

FIG. 1 schematically represents an exemplary embodiment of a system SYS in which the disclosed technology is implemented.

The system SYS comprises a first device $D_{ORCH}$ which comprises a service orchestration service ORCH, also called orchestrator, and which is configured to determine a service chain to be implemented, so as to generate a transaction.

Within the meaning of the disclosed technology, a service chain (or service sequence) is defined as a set of chained services that must be applied in a predetermined order, so as to generate a transaction. In other words, a transaction can be defined as a coherent computer operation resulting from the composition of several services. This transaction is considered atomic only if all the services of the chain are browsed, in the order established by this service chain.

A service chain can comprise a sequence of services all distinct from each other, but also the same service several times (when a transaction requires a transit several times through the same service).

Within the meaning of the disclosed technology, a service can be defined as a computer program (or software) comprising a set of computer instructions interpretable by a machine, this program being used to carry out a task, or a set of elementary tasks.

It is recalled here that the method according to the disclosed technology is independent of the implemented protocols or of the services (e.g., the functions implemented by said services).

This orchestrator determines the service chain to be implemented, for example based on the available and/or accessible services, but also based on predetermined constraints. This notion of orchestration is also well known to those skilled in the art; mention can be made as an example of the orchestrators: OpenStack™ and Kubernetes™, but also the sequencers of the operations for machine tools in the industrial world such as MapexWom®.

This first device $D_{ORCH}$ is directly connected to a second device $D_{CTRL}$ implementing a monitoring service CTRL. The functionalities of this monitoring service are described in more detail with reference to FIG. 3B. This device $D_{CTRL}$ is connected to a telecommunications network RES.

As a variant, this first device $D_{ORCH}$ is indirectly connected to the second device $D_{CTRL}$, through a telecommunications network, such as the telecommunications network RES illustrated in FIG. 1. No limitation is attached to the type of the telecommunications network RES, which is for example an Internet network, a Wi-Fi network, or a fixed or mobile telephone network. As a variant, several types of telecommunications networks RES can be used to connect together the different devices of the network. Furthermore, the connections between these different devices can be wired or wireless.

As illustrated in FIG. 1, the system SYS further comprises eight electronic devices $D_{S(i=1 \ldots 8)}$ connected to the telecommunications network RES. Each of the electronic devices $D_{S(i=1 \ldots 8)}$ is configured to implement a service S(i=1 . . . 8).

As a variant, the same electronic device $D_{S(i=1\ldots 8)}$ is configured to implement several services. Thus, the device $D_{S(1)}$ is for example configured to implement the services S(1) and S(2).

Of these eight available services, a channel might consider only one subset. Thus, the chain is for example such that SEQ=[S(1),S(2),S(3),S(3),S(1)].

FIG. 1 also illustrates that the orchestration and monitoring services are implemented by two distinct devices, $D_{ORCH}$ and $D_{CTRL}$. However, no limitation is attached to this architecture, and these orchestration and monitoring services can also be implemented by the same device.

FIG. 2A schematically represents one particular implementation of an electronic device for implementing at least one service as proposed.

FIG. 2B schematically represents one particular implementation of an electronic device for verifying a service chain as proposed.

FIG. 3A schematically represents one example of hardware architecture of an electronic device for implementing at least one service.

As illustrated by FIG. 3A, the electronic device $D_S$ for implementing a service has the hardware architecture of a computer. Thus, the device includes, in particular, a processor 1, a random access memory 2, a read only memory 3 and a non-volatile memory 4. It further includes a communication module 5.

The read only memory 3 of the device $D_S$ constitutes a recording medium as proposed, readable by the processor 1 and on which a computer program PROG_S in accordance with the disclosed technology is recorded, including instructions for the execution of steps of the method for implementing a service S(i) as proposed below. The program PROG_S defines functional modules of the device as represented in FIG. 2A, which rely on or control the hardware elements 1 to 5 mentioned above, and which comprise in particular:

- a module for receiving (MOD_RX) a first routing token (RT(i−1)) comprising message routing data between the services of a service chain;
- a module for verifying (MOD_DEST) that the at least one service is a legitimate recipient of the first routing token (RT(i−1));
- a module for implementing (MOD_CS) a function of the service (S(i));
- a module for generating (MOD_CT) a chaining token from a data verif(i)) of evidence of a passage through the current service (S(i)); and,
- a module for transmitting (MOD_TX), to the service (S(i+1)) following said service (S(i)) in the chain, the current chaining token (CT(i)) and a second routing token (RT(i)) determined from the first routing token (RT(i−1)).

Furthermore, the device $D_S$ may also include other modules, in particular to implement particular modes of the method for implementing a service, as described in more detail later.

The communication module 5 of the device $D_S$ allows it in particular to communicate with another device implementing another service, and for this purpose integrates the receiving MOD_RX and transmission MOD_TX modules, as well as hardware and software means such as those described above to implement the implementation method.

FIG. 3B schematically represents an example of hardware architecture of an electronic device $D_{CTRL}$ for verifying a service chain.

As illustrated in FIG. 3B, the electronic device $D_{CTRL}$ for verifying a service chain has the hardware architecture of a computer. Thus, the device $D_{CTRL}$ includes, in particular, a processor 1, a random access memory 2, a read only memory 3 and a non-volatile memory 4. It further includes a communication module 5.

The read only memory 3 of the device $D_{CTRL}$ constitutes a recording medium as proposed, readable by the processor 1 and on which a computer program PROG_CTRL in accordance with the disclosed technology is recorded, including instructions for the execution of steps of the method for verifying a service chain as proposed below. The program PROG_CTRL defines functional modules of the device as represented in FIG. 2B, which rely on or control the hardware elements 1 to 5 mentioned above, and which comprise in particular:

- a module for receiving (MOD_RX) a routing token RT(n) coming from the $n^{th}$ service of the chain, a chaining token CT(n) coming from the $n^{th}$ service of the chain, and n evidence data (verif(i=1 . . . n)), each data verif(i) being generated by a service S(i) of the chain;
- a module for verifying (MOD_DEST) that said monitoring service is a legitimate recipient of the routing token (RT(n)); and,
- a module for verifying (MOD_PROC) a passage through the n services of the chain, by processing of the chaining token (CT(n)) and of the n evidence data.

Furthermore, the device $D_{CTRL}$ can also include other modules, in particular to implement particular modes of the verification method, as described in more detail later.

The communication module 5 of the device $D_{CTRL}$ allows it in particular to communicate with another device implementing a service S(i) of a service chain, and integrates for this purpose the receiving module MOD_RX, as well as material and software means such as those described above to implement the verification method.

Principle of the Disclosed Technology

FIG. 4 illustrates the general principle of the disclosed technology, according to one particular exemplary implementation.

During a first step ①, the orchestration service ORCH transmits, to the monitoring service CTRL, a service chain SEQ=[S(1),S(2),S(3),S(4)] to be implemented in order to generate a transaction T.

This monitoring service CTRL recursively generates an initial routing token RT(0) comprising message routing data between the services S(1),S(2),S(3),S(4) of the chain SEQ. The monitoring service CTRL also generates an initial chaining token CT(0) which will then be processed by the different services S(1),S(2),S(3),S(4) of the chain SEQ, so to allow the monitoring service CTRL to verify the atomic nature of the transaction.

These two tokens RT(0) and CT(0) are transmitted during a step ② to the first service S(1) of the chain SEQ. This first service S(1) verifies that it is indeed the legitimate recipient by analysis of the routing token RT(0), implements a function specific to said service S(1), and generates a chaining token CT(1).

The service S(1) also determines the second service S(2) of the chain S by analysis of the routing token RT(0). Then, during a step ③, the service S(1) transmits a routing token RT(1), and the chaining token CT(1) to the next service S(2).

This second service S(2) verifies that it is indeed the legitimate recipient by analysis of the routing token RT(1), implements a function specific to the service S(2), and generates a chaining token CT(2).

The service S(2) also determines the third service S(3) of the chain S by analysis of the routing token RT(1). Then, during a step ④, the service S(2) transmits a routing token RT(2), and the chaining token CT(2) to the next service S(3).

In a relatively similar manner, this third service S(3) verifies that it is indeed the legitimate recipient by analysis of the routing token RT(2), implements a function specific to said service S(3), and generates a chaining token CT(3).

The service S(3) also determines the fourth service S(4) of the chain S by analysis of the routing token RT(2). Then, during a step ⑤, the service S(3) transmits a routing token RT(3), and the chaining token CT(3) to the next service S(4).

This fourth service S(4) verifies that it is indeed the legitimate recipient by analysis of the routing token RT(3), implements a function specific to said service S(4), and generates a chaining token CT(4).

The service S(4) also determines the next service, by analysis of the routing token RT(3). Here, it is the monitoring service CTRL. During a step ⑥, the service S(4) then transmits a routing token RT(4), and the chaining token CT(4) to the monitoring service CTRL.

The monitoring service CTRL then verifies that it is indeed the legitimate recipient by analysis of the routing token RT(4) then verifies the atomic nature of the transaction T based on the chaining token CT(4). This step is described in more detail with reference to FIGS. 5A, 5B, 6A, 6B.

In other words, the disclosed technology relates to a method for implementing a service (S(i)), called a current service, of a chain of n services, the method comprising:
  receiving, from the service (S(i−1)) preceding the current service (S(i)) in the chain, a first routing token (RT(i−1)) comprising message routing data between the services of the chain;
  verifying that the current service is a legitimate recipient of the first routing token (RT(i−1));
  implementing a function of the current service;
  generating a chaining token, called current chaining token (CT(i)), comprising data of evidence of a passage through a current service (S(i)); and,
  transmitting, to the service (S(i+1)) following the current service (S(i)) in the chain, the current chaining token (CT(i)) and a second routing token (RT(i)) determined from the first routing token.

First Implementation

FIG. 5 comprises FIG. 5A and FIG. 5B and represents, in flowchart form, a first particular implementation of a general method for monitoring a transaction resulting from the passage through a set of chained services as proposed, and includes a method for verifying a service chain implemented by a verification device $D_{CTRL}$, and a method for implementing a service S(i) implemented by each of the devices $D_{S(i)}$.

The monitoring service CTRL comprises a symmetric encryption algorithm $ENC_{CTRL}(\ )$, an encryption key $K_{CTRL}$, an identifier $ID_{CTRL}$ and a hash function $H_{CTRL}$. These data are for example stored in the non-volatile memory 4 of the verification device $D_{CTRL}$.

Each service S(i) also comprises a symmetric encryption algorithm $ENC_{s(i)}(\ )$, a cryptographic key $K_{s(i)}$, an identifier $ID_{s(i)}$ and a hash function $H_{s(i)}$. These data are for example stored in the non-volatile memory 4 of each device $D_{s(i)}$ for implementing a service.

According to the disclosed technology, a service is identified by discriminating information on a device, and $ID_{s(i)}$ corresponds for example to:

an API carried by a URL;
an email address or a messaging identifier;
an IP port carried by an IP address;
an identifier carried by a messaging system;
a port number on other local connectivity protocols associated with a logical address following these communication protocols;
a MAC address
a memory address or an interruption within electronic equipment.

According to the disclosed technology, a service S(i) can also be identified by its electronic certificate, for example compliant with the standard X.509.

As illustrated in FIG. 5, the general method for monitoring a transaction comprises a first step S100, of receiving a service chain SEQ=[S(1),S(2),S(3)], as well as a data $M_0$ on which the different services of the chain must apply a function of their own, so as to generate a transaction T.

During a step S105, the monitoring service CTRL generates a time stamp $T_0$. This time stamp is particularly advantageous in order to avoid a replay attack. As a variant, it would also be possible to use a value randomly generated by the monitoring service CTRL.

During a step S110, the monitoring service CTRL generates a transaction identifier $ID_T$, then a secret routing value $R_{SEC}$ as well as a secret chaining value $C_{SE}C$ during a step S115.

The method further comprises a step S120 of generating an initial routing token RT(0) recursively from a routing token RT(n), where n corresponds to the number of services of the chain.

Thus, RT(n) is for example defined such that RT(n) $=ENC_{CTRL}(ID_{CTRL}|ID_T|R_{SEC},K_{CTRL})$ with | the concatenation operator, and $RT(n-1)=ENC_{s(n)}(ID_{s(n)}|ID_{CTRL}|RT(n),K_{s(n)})$

[ . . . ] $RT(i)=ENC_{s(i+1)}(ID_{s(i+1)}|ID_{s(i+2)}|RT(i+1),K_{s(i+1)})$

[ . . . ] $RT(0)=ENC_{s(1)}(ID_{s(1)}|ID_{s(2)}|RT(1),K_{s(1)})$

As illustrated in FIG. 5, n=3, and therefore RT(0) is calculated as follows:

$RT(3)=ENC_{CTRL}(ID_{CTRL}|ID_T|R_{SEC},k_{CTRL})$;

$RT(2)=ENC_{s(3)}(ID_{s(3)}|ID_{CTRL}|RT(3),K_{s(3)})$ $RT(1)=ENC_{s(2)}(ID_{s(2)}|ID_{s(3)}|RT(2),K_{s(2)})$ and therefore $RT(0)=ENC_{s(1)}(ID_{s(1)}|ID_{s(2)}|RT(1),K_{s(1)})$ The method further comprises a step S130 during which the monitoring service CTRL generates a first evidence data verif(0) such that verif(0)=$H_{CTRL}(T_0|C_{SEC})$ then calculates an initial chaining token CT(0) such that CT(0)=$ENC_{CTRL}$(verif(0),$K_{CTRL}$). As a variant, verif(0) is calculated such that verif(0)=$H_{CTRL}(M_0|T_0|C_{SEC})$.

Then, during a step S135, the monitoring service CTRL transmits the transaction identifier $T_{ID}$, the routing token RT(0), the chaining token CT(0), as well as a data $M_0$ to the first service S(1) of the chain.

These data are thus received by the first service S(1) during a step referenced S200-1. This step is implemented by the module MOD_RX of the device $D_{S(1)}$ for implementing the service S(1). During a step S210-1, the service S(1) decrypts the routing token RT(0) using its cryptographic key $K_{S(1)}$ and then obtains a first identifier $ID'_{S(1)}$, a second identifier $ID_{S(2)}$ identifying the next service of the chain, and the routing token RT(1).

The method further comprises a step S220-1 during which the service S(1) verifies whether the identifier $ID'_{S(1)}$ obtained by decryption of the token RT(0) corresponds to its own token $ID_{S(1)}$. If so, this means that the service S(1) is the legitimate recipient, and step S230-1 is implemented. Otherwise, optionally, the service S(1) transmits a processing error or rejection message to the monitoring service. As a variant, the service S(1) aborts the transaction or transmits to the next service (S(2)) a processing error or rejection message. This step is implemented by the module MOD_DEST of the device $D_{S(1)}$ for implementing the service S(1).

During step S230-1, the service S(1) applies a function specific to said service S(1) to the data $M_0$, so as to generate a data $M_1$. This step is implemented by the module MOD_CS of the device $D_{S(1)}$ for implementing the service S(1).

During a step S240-1, the service S(1) generates a time stamp $T_1$, as well as evidence data verif(1) such that verif(1)=$H_{S(1)}(T_1|M_1|RT(1))$ during a step S250-1. The method further comprises a step S260-1 during which the service S(1) generates a chaining token CT(1) such that CT(1)= $ENC_{S(1)}(verif(1),k_{S(1)})$ XOR CT(0). This step is implemented by the module MOD_CT of the device $D_{S(1)}$ for implementing the service S(1).

More generally, each service S(i) with i=1 ... n, n being the number of services of the chain SEQ, generates an evidence data verif(i) such that verif(i)=$H_{S(i)}(i|M_i|RT(i))$ as well as a chaining token CT(i) such that CT(i)=$ENC_{S(i)}(verif(i),k_{S(i)})$ XOR CT(i−1).

Finally, during a step S270-1, the service S(1) transmits the transaction identifier $T_{ID}$, the routing token RT(1), the chaining token CT(1), the evidence data verif(1), as well as the data $M_1$ to the second service S(2) of the chain. This step is implemented by the module MOD_TX of the device $D_{S(1)}$ for implementing the service S(1). It is recalled here that this second service S(2) had been identified by the first service S(1) through the identifier $ID_{S(2)}$ obtained during step S210-1.

These data are received by the second service S(2) during a step referenced S200-2. This step is implemented by the module MOD_RX of the device $D_{S(2)}$ for implementing the service S(2).

During a step S210-2, the service S(2) decrypts the routing token RT(1) using its cryptographic key $K_{S(2)}$ and then obtains a first identifier $ID'_{S(2)}$, a second identifier $ID_{S(3)}$ identifying the next service of the chain, and the routing token RT(2).

The method further comprises a step S220-2 during which the service S(2) verifies whether the identifier $ID'_{S(1)}$ obtained by decryption of the token RT(1) corresponds to its own token $ID_{S(2)}$. If so, this means that the service S(2) is the legitimate recipient, and step S230-2 is implemented. Otherwise, the service S(2) transmits a message to the monitoring service CTRL informing it that it is not the legitimate recipient. This step is implemented by the module MOD_DEST of the device $D_{S(2)}$ for implementing the service S(2).

During step S230-2, the service S(2) applies a function specific to said service S(2) to the data $M_1$, so as to generate a data $M_2$. This step is implemented by the module MOD_CS of the device $D_{S(2)}$ for implementing the service S(2).

During a step S240-1, the service S(2) generates a time stamp $T_2$, as well as an evidence data verif(2) such that verif(2)=$H_{S(2)}(T_2|M_2|RT(2))$ during a step S250-2. The method further comprises a step S260-2 during which the service S(2) generates a chaining token CT(2) such that CT(2)=$ENC_{S(2)}(verif(2),k_{S(2)})$ XOR CT(1). This step is implemented by the module MOD_CT of the device $D_{S(2)}$ for implementing the service S(2).

Finally, during a step S270-2, the service S(2) transmits the transaction identifier $T_{ID}$, the routing token RT(2), the chaining token CT(2), the evidence data verif(1) and verif(2), as well as the data $M_2$ to the third service S(3) of the chain. This step is implemented by the module MOD_TX of the device $D_{S(3)}$ for implementing the service S(3).

These data are received by the third service S(3) during a step referenced S200-3. This step is implemented by the module MOD_RX of the device $D_{S(3)}$ for implementing the service S(3).

During a step S210-3, the service S(3) decrypts the routing token RT(2) using its cryptographic key $K_{S(3)}$ and then obtains a first identifier $ID'_{S(3)}$, a second identifier $ID_{CTRL}$ identifying the next service of the chain, and the routing token RT(3).

The method further comprises a step S220-3 during which the service S(3) verifies whether the identifier $ID'_{S(3)}$ obtained by decryption of the token RT(2) corresponds to its own token $ID_{S(3)}$. If so, this means that the service S(3) is the legitimate recipient, and step S230-3 is implemented. Otherwise, the service S(3) transmits a message to the monitoring service CTRL informing it that it is not the legitimate recipient. This step S220-3 is implemented by the module MOD_DEST of the device $D_{S(3)}$ for implementing the service S(3).

During step S230-3, the service S(3) applies a function specific to said service S(3) to the data $M_2$, so as to generate a data $M_3$. This step is implemented by the module MOD_CS of the device $D_{S(3)}$ for implementing the service S(3).

During a step S240-3, the service S(3) generates a time stamp $T_3$, as well as an evidence data verif(3) such that verif(3)=$H_{S(3)}(T_3|M_3|RT(3))$ during a step S250-3. The method further comprises a step S260-3 during which the service S(3) generates a chaining token CT(3) such that CT(3)=$ENC_{S(3)}(verif(3),k_{S(3)})$ XOR CT(2). This step is implemented by the module MOD_CT of the device $D_{S(3)}$ for implementing the service S(3)).

Finally, during a step S270-3, the service S(3) transmits the transaction identifier $T_{ID}$, the routing token RT(3), the chaining token CT(3), the evidence data verif(1), verif(2), and verif(3), as well as the data $M_3$ to the monitoring service CTRL. This step S270-3 is implemented by the module MOD_TX of the device $D_{S(3)}$ for implementing the service S(3).

These data are received by the monitoring service CTRL during a step referenced S140. This step S140 is implemented by the module MOD_RX of the device $D_{CTRL}$ for verifying a service chain.

During a step S150, the monitoring service CTRL decrypts the routing token RT(3) using its cryptographic key $K_{CTRL}$, and then obtains a first identifier $ID'_{CTRL}$, a second identifier $ID_T$ identifying a transaction, and a secret routing value $R'_{SEC}$.

The method further comprises a step S160 during which the monitoring service CTRL verifies whether the identifier $ID'_{CTRL}$ obtained by decryption of the token RT(3) corresponds to its own token $ID_{CTRL}$. If so, this means that the service CTRL is the legitimate recipient, and step S165 is implemented. This step is implemented by the module MOD_DEST of the device $D_{CTRL}$ for verifying a service chain.

During step S165, the monitoring service CTRL verifies whether the secret routing value $R'_{SEC}$ is equal to the secret routing value $R_{SEC}$ generated during step S115. If so, this allows the monitoring service to make sure that the routing token RT(n) received comes from a processing, by different services, of a routing token that this monitoring service had initially generated.

The method further comprises a step S170 during which the monitoring service CTRL verifies the passage through the n services of the chain, by processing of the chaining token CT(n) and of the n evidence data. This step is implemented by the module MOD_PROC of the device $D_{CTRL}$ for verifying a service chain.

This step S170 comprises a first sub-step S1710 during which the service CTRL iteratively calculates the token $CT_{VALID}(i)$ such that $CT'(i-1)=ENC_{S(i)}(verif(i),K_{S(i)})$ XOR CT(i) for i=n . . . 1.

In other words, for the example illustrated in FIG. 5, the monitoring service CTRL calculates CT'(0) such that:

$$CT'(2)=ENC(verif(3),K_{s(3)}) XOR\ CT(3)$$

$$CT'(1)=ENC(verif(2),K_{s(2)}) XOR\ CT'(2)$$

$$CT'(0)=ENC(verif(1),K_{s(1)}) XOR\ CT'(1)$$

During a sub-step S1720, the monitoring service CTRL obtains the value verif(0) used during step S130, for example by accessing the non-volatile memory 4 of the monitoring device $D_{CTRL}$. Then, during step S1730, the service CTRL recalculates the initial chaining token CT(0) such that $CT(0)=ENC_{CTRL}(verif(0),K_{CTRL})$, as during step S130. Finally, during a sub-step S1740, the service CTRL verifies whether the values CT'(0) and CT(0) are equal. If so, this means that transaction T is an atomic transaction, and that the data $M_0$ has actually passed between each of the services of the sequence in the order defined by this sequence.

Variant to the First Implementation ("Centralized Configuration")

The first implementation illustrated by FIG. 5 has been described in the case where a current service S(i):
- receives a data verif(i−1) of evidence that a data has actually passed through the previous service S(i−1);
- generates a data verif(i) of evidence that a data has actually passed through said current service; and,
- transmits the data verif(i−1) and verif(i) to the next service.

However, the disclosed technology nonetheless remains applicable when, for each service S(i), said evidence data verif(i) is directly transmitted to the monitoring service CTRL.

Second Implementation

FIG. 6 comprises FIG. 6A and FIG. 6B and represents, in flowchart form, a second particular implementation of a general method for monitoring a transaction resulting from the application of a set of chained services as proposed, and includes a method for verifying a service chain implemented by a verification device $D_{CTRL}$, and a method for implementing a service S(i) implemented by devices $D_{S(i)}$.

The monitoring service CTRL comprises an encryption $ENC_{CTRL}(\ )$ and decryption $DENC_{CTRL}(\ )$ algorithm, a cryptographic key $K_{CTRL}$, an identifier $ID_{CTRL}$ and a hash function $H_{CTRL}$. These data are for example stored in the non-volatile memory 4 of the verification device $D_{CTRL}$.

Each service S(i) also comprises a symmetric encryption algorithm $ENC_{S(i)}(\ )$, a cryptographic key $K_{s(i)}$, an identifier $ID_{s(i)}$ and a hash function $H_{s(i)}$. These data are for example stored in the non-volatile memory 4 of each device $D_{s(i)}$ for implementing a service.

As illustrated in FIG. 6, the general method for monitoring a transaction comprises a first step S100 of receiving a service chain SEQ=[S(1),S(2),S(3)].

During a step S105, the monitoring service CTRL generates a time stamp $T_0$. This time stamp is particularly advantageous in order to avoid a replay attack. As a variant, it would also be possible to use a value randomly generated by the monitoring service CTRL.

During a step S110, the monitoring service CTRL generates a transaction identifier $ID_T$, then a secret routing value $R_{SEC}$ as well as a secret chaining value $C_{SEC}$ during a step S115.

The method further comprises a step S120 of generating an initial routing token RT(0) recursively from a routing token RT(n), where n corresponds to the number of services of the chain.

Thus, RT(n) is for example defined such that $RT(n)=ENC_{CTRL}(ID_{CTRL}|ID_T|R_{SEC},K_{CTRL})$ with | the concatenation operator, and $RT(n-1)=ENC_{s(n)}(ID_{s(n-1)}|ID_{s(n)}|ID_{CTRL}|RT(n),K_{s(n)})$

[ . . . ] $RT(i)=ENC_{s(i+1)}(ID_{s(i)}|ID_{s(i+1)}|ID_{S(i+2)}|RT(i+1),K_{s(i+1)})$

[ . . . ] $RT(0)=ENC_{s(1)}(ID_{CTRL}|ID_{s(1)}|ID_{S(2)}|RT(1),K_{s(1)})$

The method further comprises a step S130 during which the monitoring service CTRL calculates an initial chaining token CT(0) such that:

$$CT(0)=ENC_{CTRL}(C_{SEC}|T_0|HMAC(RT(0),K_{CTRL}),K_{CTRL})$$

with HMAC( ) a cryptographic function that combines the hash function $H_{CTRL}$ with the secret key $K_{CTRL}$.

Then, during a step S135, the monitoring service CTRL transmits the transaction identifier $T_{ID}$, the routing token RT(0), the chaining token CT(0) to the first service S(1) of the chain.

These data are thus received by the first service S(1) during a step referenced S200-1. This step is implemented by the module MOD_RX of the device $D_{S(1)}$ for implementing the service S(1). During a step S210-1, the service S(1) decrypts the routing token RT(0) using its cryptographic key $K_{S(1)}$ and then obtains a first identifier $ID'_{CTRL}$, a second identifier $ID'_{S(1)}$, a third identifier $ID_{S(2)}$ identifying the next service of the chain, and the routing token RT(1).

The method then comprises a step S215-1 during which the service S(1) verifies whether the identifier $ID'_{CTRL}$ obtained by decryption of the token RT(0) comes from a legitimate source. This step is for example implemented by comparing the identifier $ID'_{CTRL}$ with the emitter identifier of the Ethernet frame emitted during step S135.

The method further comprises a step S220-1 during which the service S(1) verifies whether the identifier $ID'_{S(1)}$ obtained by decryption of the token RT(0) corresponds to its own token $ID_{S(1)}$. If so, this means that the service S(1) is the legitimate recipient, and step S230-1 is implemented. Otherwise, the service S(1) transmits a message to the monitoring service informing it that it is not the legitimate recipient. This step is implemented by the module MOD_DEST of the device $D_{S(1)}$ for implementing the service S(1).

During step S230-1, the service S(1) applies a function $f(1)$ specific to said service S(1). This step is implemented by the module MOD_CS of the device $D_{S(1)}$ for implementing the service S(1).

During a step S240-1, the service S(1) generates a time stamp $T_1$. The method further comprises a step S260-1 during which the service S(1) generates a chaining token CT(1) such that:

$$CT(1)=ENC_{S(1)}(CT(0)|T_1|HMAC(RT(1),K_{S(1)}),K_{S(1)})$$

with HMAC( ) a cryptographic function that combines the hash function $H_{S(1)}$ with the secret key $K_{S(1)}$.

This step is implemented by the module MOD_CT of the device $D_{S(1)}$ for implementing the service S(1).

More generally, each service S(i) with i=1 . . . n, n being the number of services of the chain SEQ, generates a chaining token CT(i) such that:

$$CT(i)=ENC_{S(i)}(CT(i-1)|T_i|HMAC_{S(i)}(RT(i),K_{S(i)}),K_{S(i)})$$

with $HMAC_{S(i)}$( ) a cryptographic function of the service S(i) and which combines the hash function $H_{S(i)}$ with the secret key $K_{S(i)}$.

Finally, during a step S270-1, the service S(1) transmits the transaction identifier $T_{ID}$, the routing token RT(1), the chaining token CT(1) to the second service S(2) of the chain. This step is implemented by the module MOD_TX of the device $D_{S(1)}$ for implementing the service S(1). It is here recalled that this second service S(2) had been identified by the first service S(1) through the identifier $ID_{s(2)}$ obtained during step S210-1.

These data are received by the second service S(2) during a step referenced S200-2. This step is implemented by the module MOD_RX of the device $D_{S(2)}$ for implementing the service S(2).

During a step S210-2, the service S(2) decrypts the routing token RT(1) using its cryptographic key $K_{S(2)}$ and then obtains a first identifier $ID'_{s(1)}$, a second identifier $ID_{s(2)}$, a third identifier $ID_{s(3)}$ identifying the next service of the chain, and the routing token RT(2).

The method then comprises a step S215-2 during which the service S(2) verifies whether the identifier $ID'_{S(1)}$ obtained by decryption of the token RT(1) comes from a legitimate source, and this, in a manner similar to step S215-1.

The method also comprises a step S220-2 during which the service S(2) verifies whether the identifier $ID'_{s(2)}$ obtained by decryption of the token RT(1) corresponds to its own token $ID_{s(2)}$. If so, this means that the service S(2) is the legitimate recipient, and step S230-2 is implemented. Otherwise, the service S(2) transmits a message to the monitoring service CTRL informing it that it is not the legitimate recipient. This step is implemented by the module MOD_DEST of the device $D_{S(2)}$ for implementing the service S(2).

During step S230-2, the service S(2) applies a function $f(2)$ specific to said service S(2). This step is implemented by the module MOD_CS of the device $D_{S(2)}$ for implementing the service S(2).

During a step S240-1, the service S(2) generates a time stamp $T_2$. The method further comprises a step S260-2 during which the service S(2) generates a chaining token CT(2) such that:

$$CT(2)=ENC_{S(2)}(CT(1)|T_2|HMAC(RT(2),K_{S(2)}),K_{S(2)})$$

with HMAC( ) a cryptographic function that combines the hash function $H_{S(2)}$ with the secret key $K_{S(2)}$.

This step is implemented by the module MOD_CT of the device $D_{S(2)}$ for implementing the service S(2).

Finally, during a step S270-2, the service S(2) transmits the transaction identifier $T_{ID}$, the routing token RT(2), the chaining token CT(2) to the third service S(3) of the chain. This step is implemented by the module MOD_TX of the device $D_{S(3)}$ for implementing the service S(3).

These data are received by the third service S(3) during a step referenced S200-3. This step is implemented by the module MOD_RX of the device $D_{S(3)}$ for implementing the service S(3).

During a step S210-3, the service S(3) decrypts the routing token RT(2) using its cryptographic key $K_{S(3)}$ and then obtains a first identifier $ID'_{s(2)}$, a second identifier $ID'_{s(3)}$ and a third identifier $ID_{CTRL}$ identifying the next service of the chain, and the routing token RT(3).

The method then comprises a step S215-3 during which the service S(3) verifies whether the identifier $ID'_{S(2)}$ obtained by decryption of the token RT(2) comes from a legitimate source, and this, similarly to step S215-1.

The method then comprises a step S220-3 during which the service S(3) verifies whether the identifier $ID'_{s(3)}$ obtained by decryption of the token RT(2) corresponds to its own token $ID_{s(3)}$. If so, this means that the service S(3) is the legitimate recipient, and step S230-3 is implemented. Otherwise, the service S(3) transmits a message to the monitoring service CTRL informing it that it is not the legitimate recipient. This step S220-3 is implemented by the module MOD_DEST of the device $D_{S(3)}$ for implementing the service S(3).

During step S230-3, the service S(3) applies a function $f(3)$ specific to said service S(3). This step is implemented by the module MOD_CS of the device $D_{S(3)}$ for implementing the service S(3).

During a step S240-3, the service S(3) generates a time stamp $T_3$. The method further comprises a step S260-3 during which the service S(3) generates a chaining token CT(3) such that:

$$CT(3)=ENC_{S(3)}(CT(2)|T_3|HMAC(RT(3),K_{S(3)}),K_{S(3)})$$

with HMAC( ) a cryptographic function that combines the hash function $H_{S(3)}$ with the secret key $K_{S(3)}$.

This step is implemented by the module MOD_CT of the device $D_{S(3)}$ for implementing the service S(3).

Finally, during a step S270-3, the service S(3) transmits the transaction identifier $T_{ID}$, the routing token RT(3) and the chaining token CT(3) to the monitoring service CTRL. This step S270-3 is implemented by the module MOD_TX of the device $D_{S(3)}$ for implementing the service S(3).

These data are received by the monitoring service CTRL during a step referenced S140. This step S140 is implemented by the module MOD_RX of the device $D_{CTRL}$ for verifying a service chain.

During a step S150, the monitoring service CTRL decrypts the routing token RT(3) using its cryptographic key $K_{CTRL}$, and then obtains a first identifier $ID'_{CTRL}$, a second identifier $ID_T$ identifying a transaction, and a secret routing value $R'_{SEC}$.

During a step S155, the monitoring service CTRL verifies whether the identifier $ID'_T$ obtained by decryption of the token RT(3) corresponds to the transaction identifier generated in step S110. If so, step S160 is implemented.

During step S160, the monitoring service CTRL verifies whether the identifier $ID'_{CTRL}$ obtained by decryption of the token RT(3) corresponds to its own token $ID_{CTRL}$. If so, this means that the service CTRL is the legitimate recipient, and step S165 is implemented. This step is implemented by the module MOD_DEST of the device $D_{CTRL}$ for verifying a service chain.

During step S165, the monitoring service CTRL verifies whether the secret routing value $R'_{SEC}$ is equal to the secret routing value $R_{SEC}$ generated during step S115. If so, this allows the monitoring service to make sure that the received routing token RT(n) comes from a processing, by different services, of a routing token that this monitoring service had initially generated.

The method further comprises a step S170 during which the monitoring service CTRL verifies the passage through the n services of the chain, by processing of the chaining token CT(n). This step is implemented by the module MOD_PROC of the device $D_{CTRL}$ for verifying a service chain.

This step S170 comprises a first sub-step S1710 during which the service CTRL iteratively calculates the token $CT_{VALID}(i)$ such that:

$$CT_{VALID}(i)=DENC_{S(i)}(CT(i-1)|T_i|HMAC(RT(i),K_{S(i)}), K_{S(i)}) \text{ for } i=n \ldots 1$$

and $CT_{VALID}(0)=DENC_{CTRL}(C_{SEC}|T_0|HMAC_{CTRL}(RT(0),K_{CTRL}),K_{CTRL})$ with $DENC_{S(i)}(\ )$ a decryption function associated with the service S(i) for i=n . . . 1 and $DENC_{CTRL}$ a decryption function associated with the monitoring service (for i=0).

The monitoring service CTRL is initially provisioned with the decryption functions associated with the services S(i). Furthermore, the time stamps $T_i$ are for example received by the monitoring service CTRL through messages emitted by the different services of the chain.

In one particular implementation, the monitoring service CTRL verifies the consistency of all the parameters collected and particularly the temporal consistency of the time stamps $T_i$.

During a sub-step S1720, the monitoring service CTRL obtains the value CT(0) generated during step S130, for example by accessing the non-volatile memory 4 of the monitoring device $D_{CTRL}$. Finally, during a sub-step S1740, the service CTRL verifies whether the values $CT_{VALID}(0)$ and CT(0) are equal. If so, this means that the transaction T is an atomic transaction.

FIG. 7 represents one example of implementation of the disclosed technology, in accordance with the second particular implementation illustrated by FIG. 6, in the context of a "Mobile Connect" type transaction.

A controller CTRL is provisioned with a service chain SEQ=[S(1),S(2),S(3),S(2),S(1)], the identifiers $ID_{CTRL}$, $ID_{S(1)}$, $ID_{S(2)}$, $ID_{S(2)}$, the encryption keys of the controller and of the services $K_{CTRL}$, $K_{s(1)}$, $K_{s(2)}$, $K_{s(3)}$. $T_n$ corresponds to a time stamp, and $M_n$ corresponds to an initial message of the sequence.

S(0) corresponds to a service provider service, S(1) corresponds to an identity provider service, S(2) corresponds to a service implementing, at the level of a server, the Extensible Authentication Protocol by using a Universal Subscriber Identity Module (USIM), for example the SIM card of a mobile phone of the user, and S(3) corresponds to a service implementing, at the level of the mobile phone of the user, the Extensible Authentication Protocol.

The service S(0) requests an identification/authentication on the service chain SEQ=[S(1), S(2), S(3), S(2), S(1)] from the service S(1).

The service S(1) then requests the monitoring service CTRL which generates a time stamp $T_0$, a transaction identifier $ID_T$, then a secret routing value $R_{SEC}$ as well as a secret chaining value $C_{SEC}$.

The monitoring service CTRL then calculates the following routing tokens:

$$RT(5)=ENC_{CTRL}(ID_{CTRL}|ID_T|R_{SEC},K_{CTRL})$$

$$RT(4)=ENC_{s(1)}(ID_{s(2)}|ID_{s(1)}|ID_{CTRL}|RT(5),K_{s(1)})$$

$$RT(3)=ENC_{s(2)}(ID_{s(3)}|ID_{s(2)}|ID_{s(1)}|RT(4),K_{s(2)})$$

$$RT(2)=ENC_{s(3)}(ID_{s(2)}|ID_{s(3)}|ID_{s(2)}|RT(3),K_{s(3)})$$

$$RT(1)=ENC_{s(2)}(ID_{s(1)}|ID_{s(2)}|ID_{s(3)}|RT(2),K_{s(2)})$$

$$RT(0)=ENC_{s(1)}(ID_{CTRL}|ID_{s(1)}|ID_{s(2)}|RT(1),K_{s(1)})$$

The monitoring service CTRL then calculates the first chaining token CT(0) such that:

$$CT(0)=ENC_{CTRL}(C_{SEC}|T_0|HMAC_{CTRL}(RT(0),K_{CTRL}),K_{CTRL})$$

The monitoring service CTRL then saves the following data in order to carry out the necessary verifications at the end of the chain: $ID_T$, $ID_{CTRL}$, $R_{SEC}$, $C_{SEC}$, $T_0$, RT(0), RT(1), RT(2), RT(3), RT(4) and RT(5).

The monitoring service CTRL transmits the following data to the first service S(1) of the chain: $ID_T$, RT(0), CT(0). This first service S(1) decrypts the token RT(0) with $K_{S(1)}$ and obtains $ID_{CTRL}$, $ID_{S(1)}$, $ID_{S(2)}$, RT(1).

This first service S(1) verifies the identity of the emitter (e.g., the monitoring service CTRL), its identity, identifies the next service S(2) and accesses RT(1), value of the routing token to be transmitted to S(2). Furthermore, S(1) generates a time stamp $T_1$ then calculates CT(1) such that:

$$CT(1)=ENC_{S(1)}(CT(0)|T_1|HMAC_{S(1)}(RT(1),K_{S(1)}),K_{S(1)})$$

Then the service S(1) transmits the following data to the service S(2): $ID_T$, RT(1), CT(1).

This second service S(2) decrypts the token RT(1) with $K_{S(2)}$ and obtains $ID_{S(1)}$, $ID_{S(2)}$, $ID_{S(3)}$, RT(2).

This second service S(2) verifies the identity of the emitter (e.g., S(1)), its identity, identifies the next service S(3) and accesses RT(2), value of the routing token to be transmitted to S(3). Furthermore, S(2) generates a time stamp $T_2$ then calculates CT(2) such that:

$$CT(2)=ENC_{S(2)}(CT(1)|T_2|HMAC_{S(2)}(RT(2),K_{S(2)}),K_{S(2)})$$

Then the service S(2) transmits the following data to the service S(3): $ID_T$, RT(2), CT(2).

This third service S(3) decrypts the token RT(2) with $K_{S(3)}$ and obtains $ID_{S(2)}$, $ID_{S(3)}$, $ID_{S(2)}$, RT(3).

This third service S(3) verifies the identity of the emitter (e.g., S(2)), its identity, identifies the next service S(2) and accesses RT(3), value of the routing token to be transmitted to S(2). Furthermore, S(3) generates a time stamp $T_3$ then calculates CT(3) such that:

$$CT(3)=ENC_{S(3)}(CT(2)|T_3|HMAC_{S(3)}(RT(3),K_{S(3)}),K_{S(3)})$$

Then the service S(3) transmits the following data to the service S(2): $ID_T$, RT(3), CT(3).

The service S(2) decrypts the token RT(3) with $K_{S(2)}$ and obtains $ID_{S(3)}$, $ID_{S(2)}$, $ID_{S(1)}$, RT(4).

Then S(2) verifies the identity of the emitter (e.g., S(3)), its identity, identifies the next service S(1) and accesses RT(4), value of the routing token to be transmitted to S(1). Furthermore, S(2) generates a time stamp $T_4$ then calculates CT(4) such that:

$$CT(4)=ENC_{S(2)}(CT(3)|T_4|HMAC_{S(2)}(RT(4),K_{S(2)}), K_{S(2)})$$

Finally, the service S(2) transmits the following data to the service S1: $ID_T$, RT(4), CT(4).

The service S(1) receives $ID_T$, RT(4), CT(4) then decrypts the token RT(4) with $K_{S(1)}$ and obtains $ID_{S(2)}$, $ID_{S(1)}$, $ID_{CTRL}$, RT(5).

Then S(1) verifies the identity of the emitter (e.g., S(2)), its identity, identifies the next service CTRL and accesses RT(5), value of the routing token to be transmitted to CTRL. Furthermore, S(1) generates a time stamp $T_5$ then calculates CT(5) such that:

$$CT(5)=ENC_{S(1)}(CT(4)|T_5|HMAC_{S(1)}(RT(5),K_{S(1)}), K_{S(1)})$$

Finally, the service S(1) transmits the following data to the service CTRL: $ID_T$, RT(5), CT(5).

The monitoring service CTRL receives $ID_T$, RT(5), CT(5) then accesses, with the received identifier $ID_T$, the following data: $ID_T$, $ID_{CTRL}$, $R_{SEC}$, $C_{SEC}$, $T_0$, RT(0), RT(1), RT(2), RT(3), RT(4) and RT(5).

The monitoring service CTRL decrypts the routing token RT(5) using its cryptographic key $K_{CTRL}$, and then obtains an identifier $ID'_T$ identifying a transaction, $ID'_{CTRL}$, and a secret routing value $R'_{SEC}$.

As indicated previously, the monitoring service CTRL verifies whether the identifier $ID'_T$ obtained by decryption of the token RT(5) corresponds to the previously generated transaction identifier.

Then the monitoring service CTRL verifies whether the identifier $ID'_{CTRL}$ obtained by decryption of the token RT(5) corresponds to its own token $ID_{CTRL}$. If so, this means that the service CTRL is the legitimate recipient.

The monitoring service CTRL also verifies whether the secret routing value $R'_{SEC}$ is equal to the previously generated secret routing value $R_{SEC}$.

Finally, the monitoring service CTRL verifies the passage through the services of the chain, in accordance with said chain, by processing of the chaining token CT(5).

More specifically, the service CTRL iteratively calculates:

$$CT_{VALID}(4)=DENC_{S(1)}(CT(4)|T_4|HMAC_{S(1)}(RT(5), K_{S(1)}), K_{S(1)}) \ldots$$

and $CT_{VALID}(0)=DENC(C_{SEC}|T_0|HMAC_{CTRL}(RT(0), K_{CTRL}), K_{CTRL})$

The monitoring service obtains the previously generated value CT(0) and then verifies whether the values $CT_{VALID}(0)$ and CT(0) are equal. If so, this means that the transaction T is an atomic transaction.

The monitoring service CTRL then generates a validation message for the atomic aspect of the transaction intended to the service S(1).

In one particular implementation, the method according to the disclosed technology is implemented in a simplified manner, for example in order to be implemented on equipment and/or services with low technical capabilities, such as some connected objects having limited memory and/or processing capacity. In this case, the encryption functions "ENC( )" are replaced by one-way functions, commonly called "hash-type function $H_{S(i)}( )$".

Furthermore, it is important to note that although the method according to the disclosed technology has been described using a timestamp in order to prevent a replay attack, its use remains optional.

In addition, the adhesion between the two chaining and routing tokens, at each iteration or only during some iterations of the method, also remains optional.

The disclosed technology has been described so far in the case where the encryption algorithms of the different services (e.g., of the monitoring service CTRL and of the services S(i=1 . . . n)) are symmetric encryption algorithms, but the disclosed technology nevertheless remains applicable in the particular case where at least one of said services uses an asymmetric encryption algorithm.

Finally, the disclosed technology has been described in the general case where cryptographic functions (e.g., encryption and decryption) are described, but the disclosed technology nonetheless remains applicable in the particular case where these functions are available, at the level of the current service S(i), either in secret key cryptography or in public key cryptography.

In the latter case, the HMAC or hash functions must then be understood as the application of an electronic signature algorithm based on a private key associated with the certificate of the current service S(i) on the pattern to be signed (i.e. a private key exponentiation on a hash of the pattern).

Particularly, if the monitoring service CTRL and the services have asymmetric cryptographic resources, for example by having signature and encryption certificates, then the encryption and signature operations described must be adapted to these resources. Thus the encryption operations are implemented with the public encryption key of the entity that decrypts it, and the signature operations are implemented with the private signature key of the emitter. Symmetrically, the decryption operations must be implemented with the private encryption key of the recipient, and the signature verification operations with the public key of the emitter.

With reference to the second implementation previously described, the recursive calculation of the routing token RT(i−1) as a function of RT(i) then becomes:

$$RT(i-1)=ENC_{s(i)}(ID_{s(i-1)}|ID_{s(i)}|ID_{s(i+1)}|RT(i), KPUB_{s(i)})$$

with $KPUB_{s(i)}$ a public encryption key associated with the service S(i), and the cumulative calculation of the chaining token CT(i) as a function of the chaining token CT(i−1) becomes:

$$CT(i)=ENC_{CTRL}(CT(i-1)|T_i|SIGN_{S(i)}(RT(i), KPRIV_{S(i)}),KPUB_{CTRL}$$

with $KPUB_{CTRL}$ a public encryption key associated with the monitoring service CTRL, $KPRIV_{S(i)}$ a private encryption key associated with the service S(i), and $SIGN_{S(i)}$ a signature function associated with the service S(i).

The invention claimed is:

1. A method for implementing a current service, of a chain of n services, the method comprising:
   receiving, from the service preceding the current service in the chain, a first routing token comprising message routing data between the services of the chain and a first chaining token comprising data of evidence of a passage through the previous service;
   verifying that the current service is a legitimate recipient of the first routing token;
   implementing a function of the current service;
   generating a second chaining token based on the first chaining token and based on a second routing token determined from the first routing token; and transmitting, to the service following the current service in the chain, the second chaining token and the second routing token.

2. The method of claim 1, further comprising:
obtaining an emitter service identifier by applying a decryption function to the first routing token, the decryption function using a decryption key associated with the current service; and
verifying that the service preceding the current service in the chain is a legitimate emitter.

3. The method of claim 1, wherein the current service comprises an identifier of the current service, the method further comprising obtaining a recipient service identifier by applying a decryption function to the first routing token, the decryption function using a decryption key associated with the current service, wherein verifying that the current service is a legitimate recipient comprises comparing the recipient service identifier with the identifier of the current service.

4. The method of claim 1, wherein the second routing token is generated by applying a decryption function to the first routing token, the decryption function using a decryption key associated with the current service.

5. The method of claim 1, further comprising generating, by the current service, a time stamp $T_i$, wherein the second chaining token (CT(i)) is generated as a function of this time stamp.

6. The method of claim 5, wherein the second chaining token (CT(i)) is such that:

$$CT(i)=ENC_{s(i)}(CT(i-1)|T_i|HMAC(RT(i),K_{s(i)}),K_{s(i)})$$

wherein $ENC_{s(i)}(\ )$ is an encryption function associated with the current service $S(i)$ and using an encryption key $K_{s(i)}$, wherein | is a concatenation function, wherein $HMAC_{s(i)}(\ )$ is a cryptographic function combining a hash function with the encryption key $K_{s(i)}$, and wherein RT(i) is the second routing token.

7. The method of claim 1, wherein encryption, decryption, signature and identification functions at the level of the service are based on public key cryptographic technologies, and refer to an associated electronic certificate.

8. A method for verifying a chain of n services, the method being implemented by a monitoring service and comprising:
receiving a routing token (RT(n)) and a chaining token (CT(n)) coming from the $n^{th}$ service (S(n)) of the chain;
verifying that the monitoring service is a legitimate recipient of the routing token (RT(n)); and,
verifying a passage through the n services of the chain, in accordance with said chain, by processing of the chaining token (CT(n)), the processing comprising iteratively calculating a value $CT_{VALID}(i)$ for i=n . . . 1, based on a value $CT_{VALID}(i-1)$ and a chaining token (CT(i)) comprising data of evidence of a passage through a service S(i).

9. The method of claim 8, further comprising:
obtaining an emitter service identifier by applying a decryption function to the routing token, the decryption function using a decryption key associated with the monitoring service; and
verifying (S155) that the $n^{th}$ service (S(n)) of the chain is a legitimate emitter.

10. The method of claim 8, wherein the monitoring service comprises an identifier of the monitoring service, the method further comprising obtaining, by the monitoring service, a recipient service identifier by applying a decryption function to the routing token, the decryption function using a decryption key associated with the monitoring service, and wherein verifying that the monitoring service is a legitimate recipient comprises comparing the recipient service identifier with the identifier of the monitoring service.

11. The method of claim 8, further comprising:
obtaining, by the monitoring service, a first secret value used for the generation of an initial routing token (RT(0)) intended to be transmitted to the first service of the chain;
obtaining, by the monitoring service, a second secret value by application of a decryption function to the routing token RT(n) coming from the $n^{th}$ service of the chain, the decryption function using a decryption key associated with the monitoring service; and,
comparing (S165), by the monitoring service (CTRL), the first secret value ($R_{SEC}$) and the second secret value ($R_{SEC}'$).

12. The method of claim 8, further comprising generating an initial routing token RT(0) recursively from a routing token RT(n) for i=n-1 . . . 0.

13. An electronic device for implementing a current service of a chain of n services, the device comprising:
a module for receiving, from the service preceding the current service in the chain, a first routing token comprising message routing data between the services of the chain and a first chaining token comprising the data of proof of a passage through the service preceding the current service in the chain;
a module for verifying that the current service is a legitimate recipient of the first routing token;
a module for implementing a function of the current service;
a module for generating a second chaining token based on the first chaining token and based on a second routing token determined from the first routing token; and,
a module for transmitting, to the service following said current service in the chain, the second chaining token and the second routing token.

14. An electronic device for verifying a chain of n services including a monitoring service comprising:
a module for receiving a routing token RT(n) and a chaining token CT(n) coming from the $n^{th}$ service (S(n)) of the chain;
a module for verifying that said monitoring service is a legitimate recipient of the routing token (RT(n)); and,
a module for verifying a passage through the n services of the chain, in accordance with said chain, by processing of the chaining token (CT(n)), the processing comprising iteratively calculating a value $CT_{VALID}(i)$ for i=n . . . 1, based on a value $CT_{VALID}(i-1)$ and a chaining token (CT(i)) comprising data of evidence of a passage through a service S(i).

15. A non-transitory, computer readable medium having stored thereon instructions which, when executed by a processor, cause the processor to implement the method of claim 1.

16. A non-transitory, computer readable medium having stored thereon instructions which, when executed by a processor, cause the processor to implement the method of claim 8.

* * * * *